United States Patent
Schilling et al.

(10) Patent No.: US 7,149,382 B2
(45) Date of Patent: Dec. 12, 2006

(54) OPTICAL ROTARY DATA TRANSMISSION DEVICE WITH ACTIVE TERMINATION

(75) Inventors: Harry Schilling, Eichstätt (DE); Matthias Rank, Wilmering (DE); Maren Isert, München (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 9 days.

(21) Appl. No.: 11/101,009

(22) Filed: Apr. 7, 2005

(65) Prior Publication Data

US 2006/0127098 A1    Jun. 15, 2006

(30) Foreign Application Priority Data

Dec. 15, 2004   (DE)  ................ 10 2004 060 756

(51) Int. Cl.
*G02B 6/26*    (2006.01)
(52) U.S. Cl. .................................. 385/25; 385/26
(58) Field of Classification Search ............ 385/25–26
See application file for complete search history.

(56) References Cited

U.S. PATENT DOCUMENTS

| | | | |
|---|---|---|---|
| 4,109,997 A | 8/1978 | Iverson | 385/26 |
| 4,525,025 A | 6/1985 | Hohmann et al. | 385/26 |
| 4,555,631 A | 11/1985 | Martens | 250/551 |
| 5,225,057 A * | 7/1993 | LeFebvre et al. | 204/192.13 |
| 5,798,027 A * | 8/1998 | Lefebvre et al. | 204/192.26 |
| 6,104,849 A | 8/2000 | Lewis et al. | 385/26 |
| 7,010,191 B1 * | 3/2006 | Poisel et al. | 385/25 |
| 7,043,114 B1 * | 5/2006 | Popescu | 385/26 |
| 2005/0013535 A1 * | 1/2005 | Popescu | 385/26 |

FOREIGN PATENT DOCUMENTS

| | | |
|---|---|---|
| DE | 195 43 386 | 3/1997 |
| WO | 03/069392 | 8/2003 |

* cited by examiner

*Primary Examiner*—John D. Lee
(74) *Attorney, Agent, or Firm*—Kevin L. Daffer; Daffer McDaniel, LLP

(57) ABSTRACT

A device for transmitting modulated optical signals between units comprises a first unit and a second unit, the first unit being supported to be rotatable with respect to the second unit, a light guide along a circular track on the first unit, a first and a second light coupler for coupling light signals into or out of the light guide, the second light coupler being disposed on the second unit and movable with respect to the light guide. For an achievement of a high transmission bandwidth, a controllable absorber is provided in the light guide to prevent a propagation of light along a plurality of paths between the two units. In a method for operating the device, the absorber is controlled so that modulated light signals from the first and the second directions have a same amplitude at a point at which the modulated light signals have the same phase.

32 Claims, 2 Drawing Sheets

OPTICAL ROTARY DATA TRANSMISSION DEVICE WITH ACTIVE TERMINATION

BACKGROUND OF THE INVENTION

1. Field of the Invention

The invention relates to a device for transmitting optical signals between units rotatable relative to each other. Devices of this kind are preferably used in computer tomographs.

2. Description of the Prior Art

Various devices are known for transmitting optical signals between units that are rotatable relative to each other, particularly with an unobstructed inner diameter. Here a basic problem consists of designing a means for carrying light along the circumference of the device, and also suitable means for coupling light in or out. For application in computer tomographs, devices of this kind must have large unobstructed inner diameters of a magnitude of 1 meter. During rotation, the circumferential speed may be of a magnitude of 20 m/s. At the same time, data rates of more than 1 gigabyte per second (gigabaud) should be feasible.

Thus, the U.S. Pat. No. 4,109,997 discloses an optical rotary data transmission device in which the light is carried along the circumference by reflection at two opposite surfaces. Light guides or glass fibers are provided for coupling light in or out, a bundling or focusing of the light beam being effected by means of lenses. However, this device has a whole series of disadvantages. Thus, an optical transmission loss is comparatively large owing to multiple reflections at relatively steep angles. Thus, high transmitting powers are needed in an optical transmitter. Furthermore, the fabrication costs are relatively high, because of the oppositely disposed mirror-finished surfaces. Wideband data transmission with period lengths of the modulation signal which are substantially shorter than the transit time of the signal around the circumference of the device is not possible, because signals are received along multiple-paths at positions of the receiver close to the transmitter. Thus, signals received along a short path from the transmitter, and signals which have been reflected at least once around the circumference of the device, are received simultaneously. The transit time difference must be small compared with the period length of the modulation signal. Thus, with an inner diameter of about one meter, a total transit time of about 10 nanoseconds results. With this, for example, bit periods of maximally 50 nanoseconds, corresponding to a maximum transmission rate of 20 megabaud, can be achieved during a transmission of digital signals An improvement of the optical system is disclosed in the U.S. Pat. No. 4,525,025. In this, FIG. 10 particularly illustrates a specially suitable trench for a transmission of optical signals. This consists of only one part, and therefore can be manufactured at low cost. However, even this patent specification sets out no effective solution of the problem of bandwidth limitation. Thus, this device is suitable only for small diameters.

An improvement of optical coupling in or out is disclosed in the U.S. Pat. No. 4,555,631. In this, a coupling in of optical signals is effected in a mirror-coated cylinder by means of two mirrors. For coupling out, an additional coupling-out element is provided and disposed at a fixed position in the trench. Here too, the problem of bandwidth limitation has not been solved. Thus, the light is passed from a coupling-in position to a coupling-out position along two paths in opposite directions, and finally jointly evaluated in a receiver. Here too the limitation applies that the period length of the modulation signal must be substantially shorter than the transit time of the light around the circumference of the device.

In order to reduce the attenuation by a transmission path, and to increase the transmittable bandwidth, a transmission along a plurality of shortened segments is proposed in the U.S. Pat. No. 6,104,849. The shortened segments result in a reduced attenuation. Here, the maximum bandwidth is inversely proportional to the length of the segments. Thus, a larger bandwidth may be achieved with shorter segments. For this, however, a correspondingly higher number of optical transmitters or receivers is needed to cover the full circular circumference. Therefore the system costs rise in proportion to the bandwidth.

DE 195 43 386 C1 describes in general form a device for wideband signal transmission which, although making possible a large bandwidth, provides no indications of a transmission with high transmission quality. The contents of DE 195 43 386 C1 are incorporated in the present document by reference.

In WO 03/069392 a device is disclosed for wideband signal transmission by means of a light guide that is divided along the longitudinal direction.

BRIEF SUMMARY OF THE INVENTION

The invention is based on the object of designing a relatively low cost device for transmitting optical signals between two units that are rotatable with respect to each other, in such manner that a reliable transmission is made possible with low optical attenuation, for large diameter devices, high mechanical movement speeds, and high data rates. Furthermore, it is the object of a special embodiment of the invention to design the device so that also signals having period lengths which are short compared with the time of propagation of the light around the circumference of the device may be transmitted. It is another object of the invention to provide a method for operating a device for transmission of modulated optical signals between units.

According to the invention, a device for transmission of modulated optical signals between units comprises: a first unit and a second unit, the first unit being supported to be rotatable relative to the second unit about a rotation axis; a light guide disposed along a circular track on the first unit; at least one first light coupler connected to the light guide for coupling light into or out of the light guide; and at least one second light coupler disposed on the second unit and movable relative to the light guide, for coupling light into or out of the light guide; wherein a controllable absorber is provided in at least one position in an optical path of the light guide.

According to the invention, another device for transmission of modulated optical signals between units comprises: a first unit and a second unit, the first unit being supported to be rotatable relative to the second unit about a rotation axis; a light guide disposed along a circular track on the first unit; at least one first light coupler connected to the light guide for coupling light into or out of the light guide; and at least one second light coupler disposed on the second unit and movable relative to the light guide, for coupling light into or out of the light guide; wherein at least one second light coupler is designed for a directionally selective tapping of optical signals from the light guide; and a device for switching between two opposite directions of propagation of optical signals is provided so that this is effected at a position opposite to a first light coupler in such manner that a transit time difference between two signals propagating in opposite directions is smaller than one bit of a modulation signal.

The invention provides a method for operating a device for transmission of modulated optical signals between units, the device comprising: a first unit and a second unit, the first unit being supported to be rotatable relative to the second unit about a rotation axis; a light guide disposed along a circular track on the first unit; at least one first light coupler connected to the light guide for coupling light into or out of the light guide; and at least one second light coupler disposed on the second unit and movable relative to the light guide, for coupling light into or out of the light guide. The method comprises the steps of: emitting modulated light in a first direction and an opposite second direction into the light guide; receiving light transmitted in the first direction in the light guide; absorbing light transmitted in the second direction with at least one controllable absorber; and controlling the controllable absorber so that at predetermined intersection points at which modulated light from the first and second direction has a same phase, amplitudes of signals from the first and second direction are equal.

Another method for operating a device for transmission of modulated light signals between a first unit and a second unit, the first unit being supported to be rotatable relative to the second unit about a rotation axis, via a light guide disposed along a circular track on the first unit and having a light path, comprises the steps of: emitting modulated light signals from the first unit in a first direction and an opposite second direction into the light guide with at least one first light coupler at a coupling-in position; intercepting the light signals traveling in the first and second directions with a controllable absorber disposed in the light path of the light guide to be symmetrical with respect to the coupling-in position; receiving light signals tapped from the absorber with a second light coupler disposed on the second unit; and controlling the controllable absorber so that light transmitted in the first and second directions in the absorber is of a same intensity close to a mid-point of the absorber where modulated light signals from the first and the second directions have a same phase.

BRIEF DESCRIPTION OF THE DRAWINGS

In the following the invention will be described by way of example, without limitation of the general inventive concept, on embodiments and with reference to the drawings in which.

DETAILED DESCRIPTION OF PREFERRED EMBODIMENTS

Figure 1:
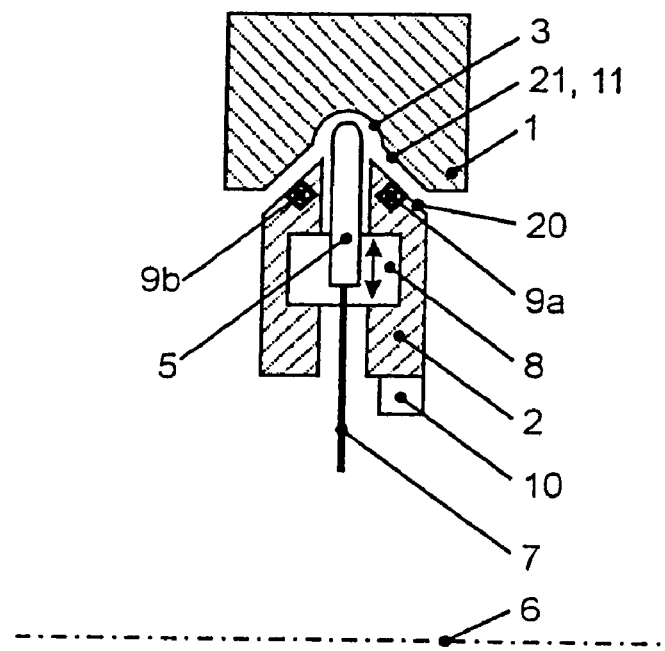
FIG. 1 schematically shows in a general form a device according to the invention.

FIG. 1 shows in a schematic form a section of a device according to the invention. In this, a first unit 1 and also a second unit 2 are depicted as being discs having a central bore, which are supported for rotation about a rotation axis 6. Here a light guide 3 is shown by way of example as being a trench having a mirror finish on the inside. It extends around the entire circumference of the first unit. In engagement with this trench is a second light coupler 5 that is assigned to the second unit 2. This light coupler taps the light carried in the light guide, and relays it with a light-guiding fiber 7. A hydrodynamic bearing means, and also an electrodynamic bearing regulation, are provided for an exact alignment of the light guide and the second light coupler along one axis. The hydrodynamic bearing means is based on a thin air film formed between a first bearing face 21 and a second bearing face 20 by the movement of the two units with respect to each other. Additional means for guiding air, for example, are provided in support. Furthermore, it is of advantage for the device to have emergency running properties to ensure some guidance even at low speeds without an adequate air film, as may occur, for example, in an acceleration or braking phase. Furthermore, a sensor 9 for determining the distance between the two units is provided for exact positioning. Here, this sensor scans the distance to a reference track 11 which in the present example is identical with the first bearing face 21. The output signals of the sensor are processed further by means of a control unit 10, and are supplied to the actuator 8 for an exact regulation of the position of the second light coupler.

Figure 2:
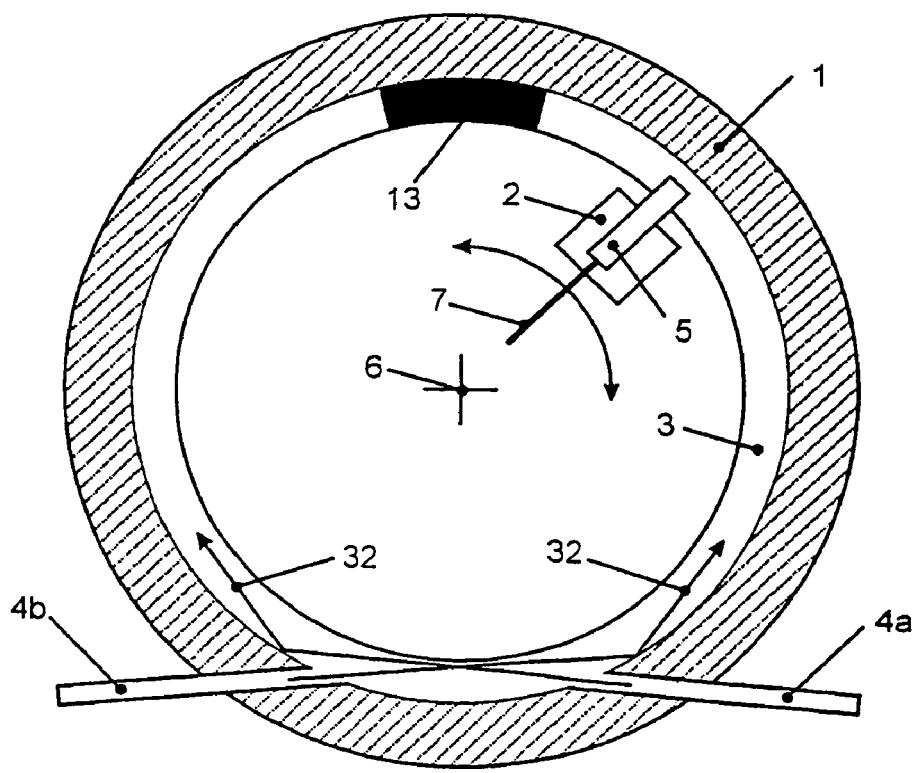
FIG. 2 schematically shows a plan view of a device according to the invention.

FIG. 2 shows in a schematic form a plan view of a device according to the invention. A first unit 1 serves to accommodate an annular light guide 3. This light guide, for example, is a trench having a mirror finish on the inside. A second unit 2 rotates about a rotation axis 6 relative to the first unit. The second unit contains a second light coupler 5.

Light from a not shown transmitter, having the same phase with reference to the modulation signal, is fed into the light guide 3 by means of two first light couplers 4a, 4b. The light from the first light coupler 4a passes along the right-hand side of the illustration as far as an absorber 13. The absorber is preferably designed to be a thin film on the inside of the trench. Simultaneously, the light from the first light coupler 4b passes along the left-hand side as far as the absorber 13. The absorber is disposed to be symmetrical with respect to the coupling-in position of the first light coupler, so that light paths 32 on both sides are of equal length. Tapping of the light is effected by means of the second light coupler 5 that is supported to be rotatable about the rotation axis of the track of a light coupler 3 and passes the light to an optical receiver. As a simplification, the optical receiver is also not illustrated. Of course, a transmission is also possible in the reverse direction.

Figure 3:
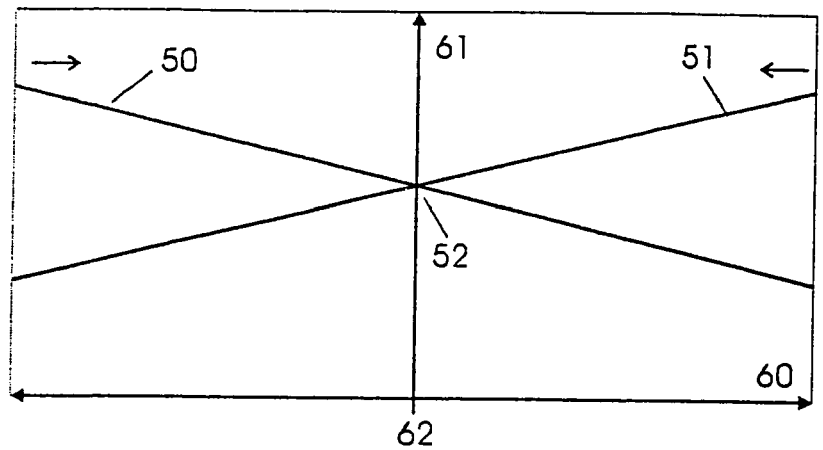
FIG. 3 illustrates the course of the intensity of the light at the position of the absorber in an ideal case.

FIG. 3 illustrates the course of the intensity of the light at the position of the absorber 13 in an arrangement as shown for example in FIG. 2. Thus, a first light beam 32 from the first light coupler 4a reaches the absorber 13, being incident from the right-hand side. The intensity of this light beam is represented by the curve 51. A second light beam 32 reaches the absorber 13 from the other first light coupler 4b, being incident in the absorber from the left-hand side. The intensity of this light beam is represented by the curve 50. The intensity axis 61 on which the intensity increases in upward direction, and also the locating axis 60 having its origin at the mid-point of the absorber, have been drawn-in to render clear the course of the intensity. The point at the middle of the light guide 3 is typical of the bandwidth of the entire transmission system 3. Thus, light modulated with the same phase is fed into the light guide from both sides through the light couplers 4a and 4b. If both segments of the light guide are of the same length, then both light beams will meet at the mid-point of the absorber at the position 62, having the same phase. If now, for example, the second light coupler 5 passes the light guide from left to right at the position of the absorber, then it will first tap the light of higher intensity 50 from the left-hand segment, and the light of lower intensity 51 from the right-hand segment. Owing to the lower intensity 51 of the light, a minor phase shift with respect to the light coming from the left will be hardly noticeable. With further movement of the second light coupler to the right, the intensity 50 of the left-hand light beam will decrease and the intensity 51 of the right-hand light beam will increase. The point of intersection of the intensity curves 50 and 51 is defined by the position at which the two intensities are equal. Ideally this point of intersection is exactly in the middle of the absorber, so that the light beams from both sides, having the same transit time and thus the same phase of the modulation signal, arrive at the point of intersection.

Figure 4:
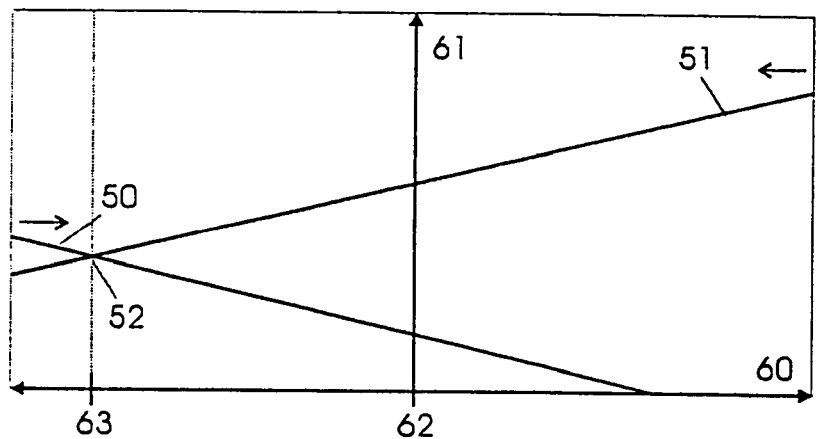
FIG. 4 shows the course of the intensity in a real arrangement having different attenuations in the segments of the light guide.

FIG. 4 shows the course of the intensity in a real arrangement having different attenuations in the segments of the light guide 3. If, for example, the attenuation in the segment of the light guide 3 on the right-hand side of the absorber is lower than that in the segment on the left-hand side, then the intensity 51 of the light beam coming from the right at the entry point of the absorber is greater than the intensity 50 of the light beam coming from the left. Accordingly, the point of intersection of the intensity curves 50 and 51 at which both intensities are equal will shift to the point 63 on the left-hand side of the mid-point 62 of the absorber. At this point of intersection the transit time of the light beam coming from the left is shorter than that of the light beam coming from the right, so that a phase shift results in the addition of the two signals. This leads to a reduction of the transmittable bandwidth, which usually cannot be neglected.

This arrangement is also suitable for equalizing different path lengths of the segments of the light guide. Similarly, positional tolerances of the absorber itself may be equalized thereby.

Figure 5:
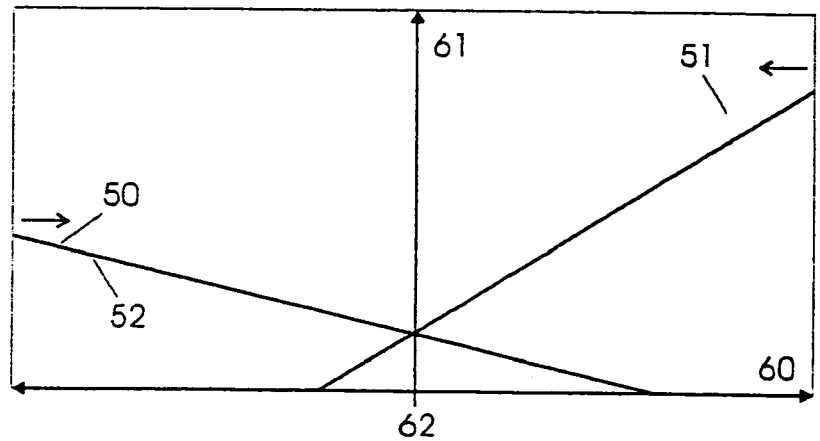
FIG. 5 shows the course of the intensity in an arrangement having a controllable absorber in accordance with the invention.

FIG. 5 shows an arrangement with a controllable absorber in accordance with the invention. Now in this absorber, starting from the case of FIG. 4 with a higher intensity 51 incident from the right, a larger attenuation is set in the corresponding right-hand side of the absorber, so that the point of intersection of the intensity curves 50 and 51 comes to lie at the exact geometrical mid-point 62, and therefore also at the geometrical mid-point of the light guide 3.

This arrangement is also suitable for equalizing different attenuations at different wavelengths, or polarizations within the segments of the light guide.

The device in accordance with the invention comprises a light guide 3 disposed alongside a circular track on a first unit 1. For the sake of simplicity, only one light guide will be described here. Of course, a plurality of arrangements in accordance with the invention, each having one light guide, may be connected in parallel. Connected to the light guide is at least one first light coupler 4 for coupling light into or out of the light guide. At least one optical transmitter or receiver is connected to at least one of these first light couplers. Whether a transmitter or a receiver is to be connected to the light guide is determined by the desired direction of transmission. If light is to be transmitted away from the light guide, then a transmitter is provided, and in the other case a receiver. For a transmission of information, the optical transmitters can of course be modulated with a modulation signal. A device in accordance with the invention can be used preferably in a computer tomograph, or also in a radar installation.

Furthermore, a second unit 2 is provided that is supported to be rotatable relative to the first unit. Here the movement of the two units with respect to each other is regarded as being relative, and no reference will be made to units that are rotating or fixed, because this is merely a matter of reference to location. To this second unit is assigned at least one second light coupler 5 that moves together with the rotation of the second unit relative to the first along a given track with respect to the light guide. At least one of these second light couplers is optionally equipped, in a manner complementary to that of the first light coupler, with an optical transmitter or receiver.

Furthermore, in accordance with the invention a controllable absorber is provided in at least one position along the optical path of the light guide 3. Optionally, the controllable absorber 13 may be contained within the light guide 3. However, it also may be incorporated in the optical path of the light passed through the light guide 3, so that the light strikes the absorber at predetermined or settable positions. A controllable absorber of this kind causes an attenuation of the light passing through it. With an attenuation that may be adjusted in accordance with the invention, the signal amplitude, or the amplitude of undesired signals, can be set as required. Thus, it is particularly easy to make allowance for different attenuations of the light guide 3, as caused for example by manufacturing tolerances. Basically, the power of the light that can be coupled out from a second light coupler 5 can be set with a controllable absorber of this kind.

In another advantageous embodiment of the invention, and in accordance with the invention, the light guide is divided into at least two segments, means being provided for an optical isolation of the segments from each other. An optical isolation may be effected, for example, by absorbing materials between the segments, by deflection of light between the segments, such as by means of mirrors, gratings, or scattering materials, or also by a separation of the directions of the optical signals.

In addition, the lengths of the segments, and also the directions of propagation of the light in the segments, are preferably dimensioned so that the modulation signal has only minor differences of transit time or phase at the boundaries between any two segments in which the same signal is being transmitted. These differences are required to be small in comparison with a period length of the modulation signal. Thus, the entire signal transit time of the signal from the optical transmitter to the optical receiver will also have only minor differences at the boundaries of the segments. A wideband signal transmission may be achieved thereby. In order for an interference-free transmission to be possible within the entire rotation range of 360 degrees, the above-mentioned conditions must apply to all connecting positions between each of two adjacent segments.

Of course, with a device in accordance with the invention a plurality of signals may also the transmitted simultaneously. It is only necessary for the previously mentioned condition to be satisfied for each of these individual signals. The relationship between different signals may be as desired.

The isolation (absorber) between a plurality of segments may also be designed to be a poorly reflecting coupling-out position. At this, for example, a monitoring receiver can be mounted for monitoring the transmitted signal amplitude. Similarly, this isolation may be implemented to be dependent on wavelength. Preferably it is designed to be a thin film. If the light guide 3 is executed to be a mirror-finished trench, then a coupling-out position is preferably executed to be a tangential bore.

In another advantageous embodiment of the invention, groups are provided, each consisting of two adjacent light guides having the same length and an opposite direction of propagation of the light. In the simplest case, the entire arrangement, as described above, possesses only one single group of this kind. Similarly, however, a plurality of such groups can be disposed along the circular circumference. They also may each be of different segment lengths, as long as both segments of a group have the same length. Thus, for example, for reasons of design different segment lengths may be provided to simplify the mounting. A division into a plurality of segments also offers the advantage that data may be transmitted in each segment independently from the adjacent segments. This means that a correspondingly higher total data rate can be achieved. If, for example, an arrangement of four groups is provided along the entire circular circumference, then the total data rate may be multiplied by means of a simultaneous transmission of four signals.

For this, advantageously the light guide is divided into an even number of segments. Owing to the even number of segments, the arrangement may be implemented very easily because of the symmetry.

A design of particularly low-cost is obtained with two segments. In order to achieve a constant transit time at the segment boundaries with two segments, these must be of the same length and have opposite directions of propagation of the light. In the case of two segments, the controllable absorber is disposed at a position of 180 degrees opposite to the coupling-in position. In the case of light being coupled into the first unit, this means that the controllable absorber is disposed to be displaced through 180 degrees about the axis of rotation of the two units.

For coupling-in light through the second unit (and transmission from there into the first unit), a controllable absorber is used which is adapted to follow the rotational motion of the second unit relative to the mirror trench. This controllable absorber also may be supported in a desired position, preferably opposite to the coupling-in position or the corresponding second light coupler, for example, with a bearing regulation means, or a hydrostatic or hydrodynamic bearing means, as is described for the second light coupler.

In the presumably most frequent case of a division of the light guide into two circular segments of equal length, the controllable absorber 13 is advantageously disposed to be as exactly as possible opposite to the first light coupler 4. At the location of the absorber, light enters from both directions of the circular segments. The transition point at which the light intensity from both directions is equal must at the same time be the point at which the phase shift between the signals of both directions is equal to zero, or at least smaller than the duration of one data bit. If now an absorber having a constant absorption factor is employed, then the transition point will correspond to the mid-point of the absorber only when the latter is fed with light of the same intensities from both directions. If the intensity from a first direction is greater than from the other direction, then the transition point will shift toward the other direction. Different light intensities in both directions may result from, for example, fluctuations or fabrication tolerances at the first light coupler 4, but also from a transmission loss of the light guide 3. In order to avoid too strong a shift of the transition point, and of transmission errors possibly resulting from this, an adjustment of the absorbers becomes necessary. This can be avoided by means of a dynamic adjustment of the controllable absorber 13. Thus, optionally the absorptive power, or also the position of the absorber, can be conformed. Advantageously, a higher absorptive power thus can be set in the direction of the signal having the higher light intensity, or the absorber can be displaced by control in this direction. In advantageous manner a regulating system is provided for this, having for example at least one light sensor for determining the intensities of the light carried in the light guide 3, or a sensor for determining the transition point. Information of this kind for determining the transition point can be obtained, for example, from the intensity of optical signals, but also from time information or jitter information of the received signal.

Another advantageous embodiment provides for the controllable absorber to be disposed along the entire circumference of the light guide, and for only correspondingly needed positions to be activated for absorption by control. The not activated regions serve for guiding light without absorption. Here the concept of activation means only a setting of an absorption. Of course, a controllable absorber having an opposite effect, which absorbs without activation and does not absorb upon activation, is also usable.

Another advantageous embodiment of the invention provides a plurality of controllable absorbers 13 which are of variable position, and/or can be activated or deactivated at given positions. With these controllable absorbers the light guide 3 is divided into a plurality of segments. These segments can then be employed for a simultaneous transmission of different signals.

Another advantageous embodiment of the invention provides a device for controlling a controllable absorber 13 in such manner that the attenuation of an optical signal between a first light coupler 4 and a second light coupler 5 is approximately constant.

In another advantageous embodiment of the invention, at least one second light coupler 5 is provided with an actuator 8. Furthermore, for this at least one sensor 9 and a control unit 10 for adjusting the position of the light coupler are present. At least one sensor is provided for determining the position of the light coupler, the signals of which are transmitted to the control unit. The control unit generates appropriate control signals for the actuator, so that the position of the light coupler along at least one axis, preferably two axes perpendicular to the tangent of the rotational motion of the two units relative to the light guide, are maintained at a given value.

Another embodiment of the invention comprises a hydrostatic or hydrodynamic bearing means, so that at least one second light coupler 5 is supported in a defined position with respect to the light guide along at least one axis, preferably along two axes perpendicular to the tangent of the rotational motion of the two units, by means of a liquid or gaseous medium, or a bearing arrangement based on a liquid or gaseous medium, preferably air.

A controllable absorber of this kind is preferably controlled with a regulating means so that a constant intensity of light is achieved optionally, depending upon the direction of transmission of the light, at a second light coupler 5 or a first light coupler 4.

A regulating means of this kind is of particular advantage for reducing the dynamic range at the input to the optical receiver, or for safeguarding the latter from optical oversaturation.

Furthermore, in an advantageous manner at least one controllable absorber 13 is designed to be wavelength-selective. Therefore its spectral properties, and preferably its absorption wavelength, can be adjusted.

Preferably a plurality of controllable absorbers are designed to be wavelength-selective and are disposed at both locations according to the segment boundaries for a respective wavelength. This embodiment permits of, for example, wavelength-dependent different segmentations, or different arrangements of the segment boundaries, as necessary with an arrangement of the light couplers at different positions.

Furthermore, it is of advantage for the controllable absorber 13 to be designed to be polarization-selective.

In another advantageous embodiment of the invention, the controllable absorber 13 comprises reversible scattering centers, the configurations of which can be controlled by a signal or a supply of energy.

For reversibly configuring scattering centers, another advantageous embodiment of the invention consists in a medium being present, certain physical properties of which change when a signal is applied or energy is supplied. Physical properties of this kind are, for example, the refractive index, the transmission, or also the volume. Here the fundamental effects may be, for example, the photorefractive effect, the effect of thermal non-linearity, the rheological effect, and others.

Another embodiment of the invention provides for the controllable absorber 13 to comprise at least one liquid crystal element.

Furthermore, it is of advantage for the controllable absorber 13 to comprise photonic crystals.

Another embodiment of the invention provides for the controllable absorber 13 to comprise a controllable deflecting element for deflecting a settable proportion of the light carried in the light guide 3 out of the light guide 3, and/or onto an absorber.

Another embodiment of the invention provides for the controllable absorber 13 to comprise a multi-layered system capable of interference.

In another advantageous embodiment, the controllable absorber 13 comprises an optical grating.

Another advantageous embodiment of the invention consists in the controllable absorber being adapted to be inserted into the light path with an optical switch.

In another advantageous embodiment, at least one absorber is at the same time suitable for receiving the optical signals. Thus, for example, it may be an optical receiver having a high absorbing power. This can now be employed for an evaluation or monitoring of the signals. In this, for example, signal contents, signal quality, or also the amplitude can be checked.

In another advantageous embodiment of the invention, at least one second light coupler 5 is provided for also coupling light from a light guide 3 and guiding it to an absorber. In this embodiment, the absorber is not directly located in the path of the light guide 3. Rather than this, its position may be altered by the second light coupler. With this, an exact positioning, for example opposite to the first light coupler 5, is possible. Furthermore, adjustments of the coupling properties, or the attenuation, are possible by adapting the position of the second light coupler 5 with respect to the light guide 3.

A device according to the invention comprises at least one second light coupler 5 that is adapted for directionally selective tapping of the optical signals from a light guide 3. This directionally selective tapping makes possible a distinction between the directions from which the light carried in the light guide 3 comes, and a correspondingly selective treatment of the light. Furthermore, a device is provided for switching between the two directions of the light. A switchover occurs at a time at which the transit time difference of the light in the light guide 3 between the point of feeding-in by a first light coupler 4, and the actual position of a second light coupler 5, is smaller than 1 bit of the modulation signal of the light carried in the light guide 3. In a symmetrical configuration of the light guide 3, this position is opposite to the position of a first light coupler 4.

A method according to the invention comprises the steps of emitting light in two opposite directions into a light guide mounted on a circular track, and receiving the light transmitted in a first direction in the light guide, and also absorbing the light transmitted in a second direction with a controllable absorber. Furthermore, in an advantageous manner a control of the controllable absorber is effected so that the intensities of the light from both directions is set to be equal exactly at the point at which the transit times from the feeding-in point into the light guide are equal.

The invention claimed is:

1. Device for transmission of modulated optical signals between units, comprising:
   a first unit and a second unit, the first unit being supported to be rotatable relative to the second unit about a rotation axis;
   a light guide disposed along a circular track on the first unit, the light guide having an optical path;
   at least one first light coupler connected to the light guide for coupling light into or out of the light guide;
   at least one second light coupler disposed on the second unit and movable relative to the light guide, for coupling light into or out of the light guide; and
   wherein a controllable absorber is provided in at least one position in the optical path of the light guide.

2. Device according to claim 1, wherein the light guide is divided into a plurality of segments, each segment being supplied with light by one of the light couplers, and wherein lengths of the segments, directions of propagation of light in the segments, and any supply leads to the segments, being designed so that at boundaries between any two segments in which a same light signal is transmitted, a transit time, or phase of a modulation signal has only slight differences that are small in comparison with a length of a period of the modulation signal.

3. Device according to claim 2, wherein groups which each consist of two adjacent segments are provided, the two adjacent segments having the same transit times and opposite directions of propagation of the light.

4. Device according to claim 2, wherein at least one controllable absorber is disposed relative to the rotation axis at a position opposite to that of the first light coupler, whereby the light guide is divided into at least two segments.

5. Device according to claim 1, wherein at least one controllable absorber is disposed along the light guide, and only a range of the absorber needed for absorption is activated by an activation signal.

6. Device according to claim 5, wherein the range needed for absorption is movable synchronously together with the second light coupler.

7. Device according to claim 6, wherein the range needed for absorption is movable synchronously together with the second light coupler at a position opposite to the second light coupler.

8. Device according to claim 1, wherein a plurality of controllable absorbers have a variable position, or are adapted to be activated and deactivated at given positions, so that they divide the light guide into a plurality of segments that are suitable for a simultaneous transmission of different light signals.

9. Device according to claim 1, wherein at least one controllable absorber is provided to be synchronously movable together with a second light coupler.

10. Device according to claim 9, wherein the at least one controllable absorber is provided to be synchronously movable together with a second light coupler at a position opposite to the second light coupler.

11. Device according to claim 1, wherein at least one second light coupler comprises an actuator, at least one sensor for this, and a control unit for adjusting a position of the second light coupler, and wherein at least one sensor is provided for determining the position of the second light coupler, the signals of which are relayed to the control unit, and wherein the control unit generates corresponding control signals for the actuator, so that the position of the light coupler along at least one axis perpendicular to a tangent of a rotational motion of both units relative to the light guide is maintained at a given value.

12. Device according to claim 11 wherein the control unit generates corresponding control signals for the actuator, so that the position of the second light coupler along two axes perpendicular to a tangent of a rotational motion of both units relative to the light guide is maintained at a given value.

13. Device according to claim 1, wherein hydrostatic or hydrodynamic bearing means are provided so that at least one second light coupler is maintained in a defined position with respect to the light guide along at least one axis perpendicular to a tangent of a rotational motion of the two units, by means of a liquid or gaseous medium, or a bearing means based on a liquid or gaseous medium.

14. Device according to claim 13, wherein the at least one second light coupler is maintained in a defined position with respect to the light guide along two axes perpendicular to a tangent of a rotational motion of the two units by means of a liquid or gaseous medium, or a bearing means based on a liquid or gaseous medium.

15. Device according to claim 14, wherein the gaseous medium is air.

16. Device according to claim 1, wherein a device for controlling a controllable absorber is provided, so that an attenuation of an optical signal between a first light coupler and a second light coupler is approximately constant.

17. Device according to claim 1, wherein at least one controllable absorber is adapted to be wavelength-selective.

18. Device according to claim 1, wherein at least one controllable absorber is adapted to be polarization-selective.

19. Device according to claim 1, wherein at least one controllable absorber comprises reversible scattering centers, a formation of which can be controlled by a signal or a supply of energy.

20. Device according to claim 1, wherein at least one controllable absorber comprises at least one liquid crystal element.

21. Device according to claim 1, wherein at least one controllable absorber comprises photonic crystals.

22. Device according to claim 1, wherein at least one controllable absorber comprises a controllable deflecting element for deflecting a settable proportion of the light carried in the light guide out of the light guide, or onto an absorber.

23. Device according to claim 1, wherein at least one controllable absorber comprises a multiple layer system capable of interference.

24. Device according to claim 1, wherein at least one controllable absorber comprises an optical grating.

25. Device according to claim 1, wherein at least one controllable absorber is adapted to be inserted into a path of the light with an optical switch.

26. Device according to claim 1, wherein at least one controllable absorber is also suitable for receiving optical signals, at least for evaluating signal amplitude.

27. Device according to claim 1, wherein at least one second light coupler is provided for coupling light out of the light guide and relaying it to an absorber.

28. Device according to claim 1, wherein a plurality of controllable absorbers have a variable position, and are adapted to be activated and deactivated at given positions, so that they divide the light guide into a plurality of segments that are suitable for a simultaneous transmission of different light signals.

29. Device according to claim 1, wherein at least one controllable absorber comprises a controllable deflecting element for deflecting a settable proportion of the light carried in the light guide out of the light guide and onto an absorber.

30. Device according to claim 1, wherein the light guide is a trench having a mirror finish on an inside wall, and the absorber is designed to be a thin film on at least one part of the inside wall.

31. Method for operating a device for transmission of modulated optical signals between units, the device comprising:
    a first unit and a second unit, the first unit being supported to be rotatable relative to the second unit about a rotation axis;
    a light guide disposed along a circular track on the first unit;
    at least one first light coupler connected to the light guide for coupling light into or out of the light guide; and
    at least one second light coupler disposed on the second unit and movable relative to the light guide, for coupling light into or out of the light guide;
    the method comprising the following steps:
        emitting modulated light in a first direction and an opposite second direction into the light guide;
        receiving light transmitted in the first direction in the light guide;
        absorbing light transmitted in the second direction with at least one controllable absorber; and
        controlling the controllable absorber so that at predetermined intersection points at which modulated light from the first and second direction has a same phase, amplitudes of light signals from the first and second direction are equal.

32. Method for operating a device for transmission of modulated light signals between a first unit and a second unit, the first unit being supported to be rotatable relative to the second unit about a rotation axis, via a light guide disposed along a circular track on the first unit and having a light path, comprising the steps of:
    emitting modulated light signals from the first unit in a first direction and an opposite second direction into the light guide with at least one first light coupler at a coupling-in position;
    intercepting the light signals traveling in the first and second directions with a controllable absorber disposed in the light path of the light guide to be symmetrical with respect to the coupling-in position;
    receiving light signals tapped from the absorber with a second light coupler disposed on the second unit; and
    controlling the controllable absorber so that light transmitted in the first and second directions in the absorber is of a same intensity close to a mid-point of the absorber where modulated light signals from the first and second directions have a same phase.

* * * * *